FIG_6
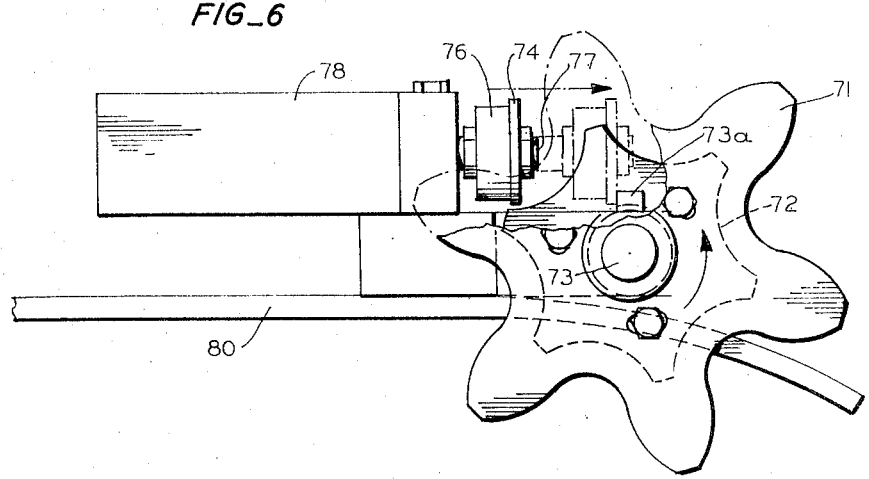
FIG_7
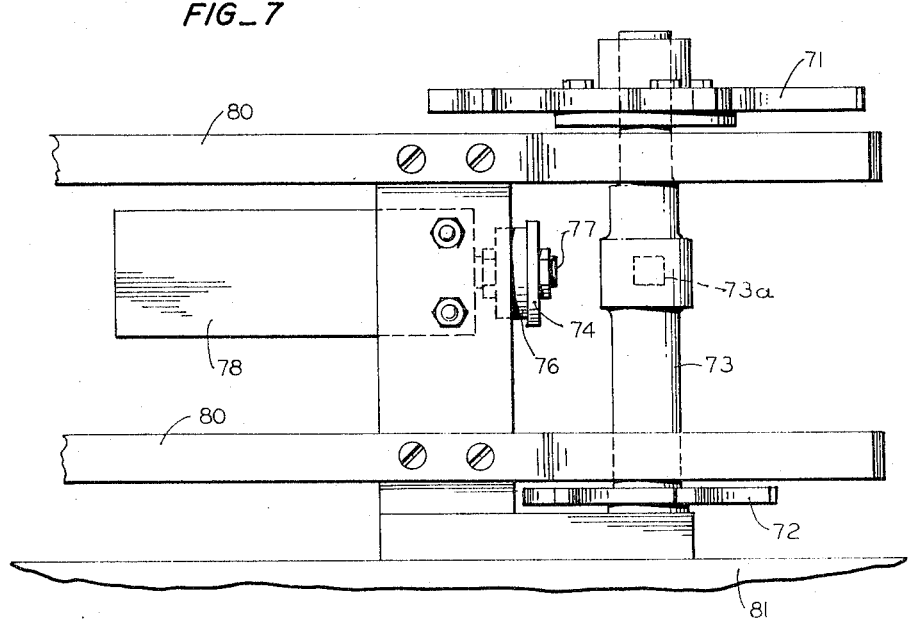
INVENTOR.
WOLFGANG B. FAHRENBACH
BY
ATTORNEYS

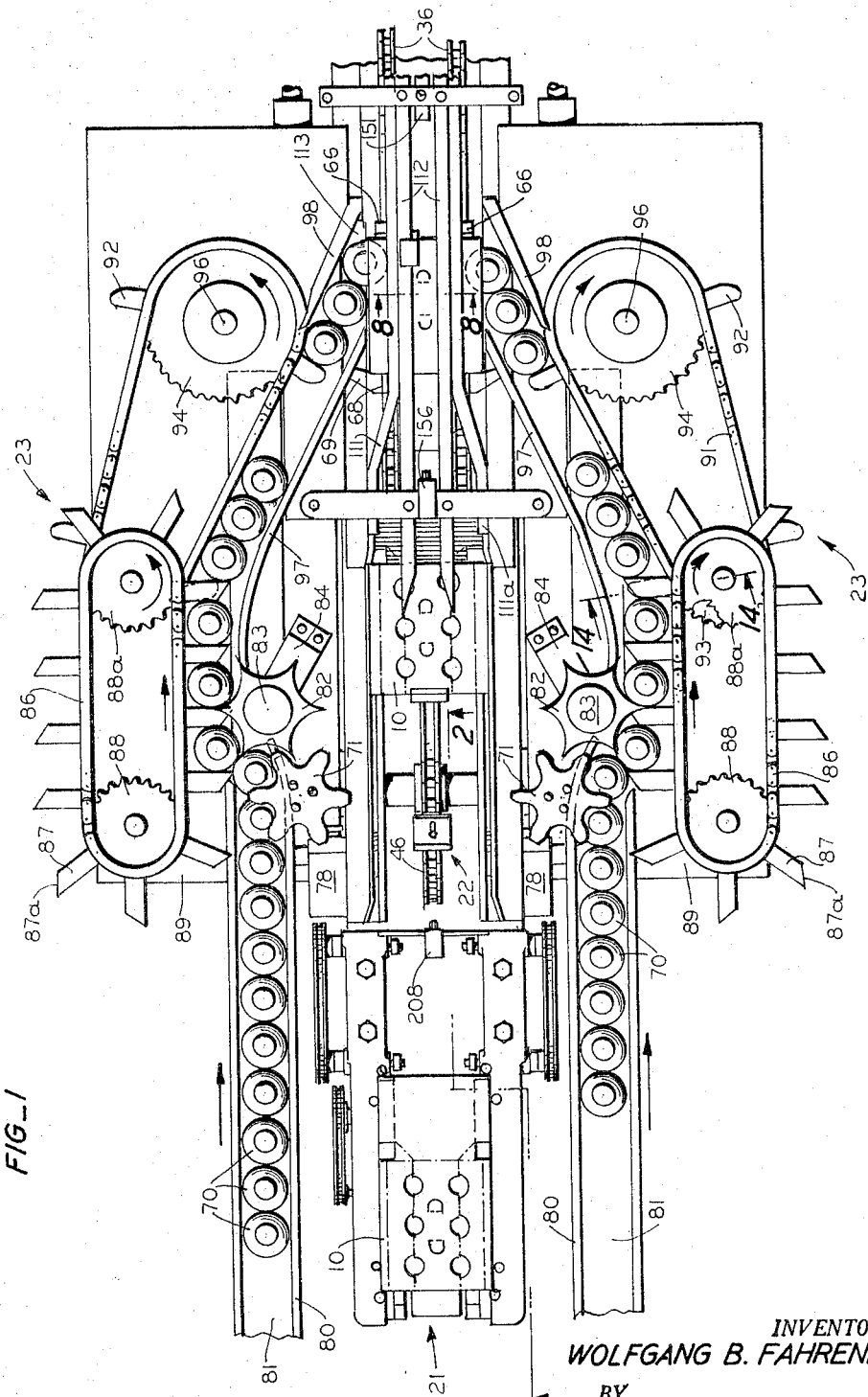

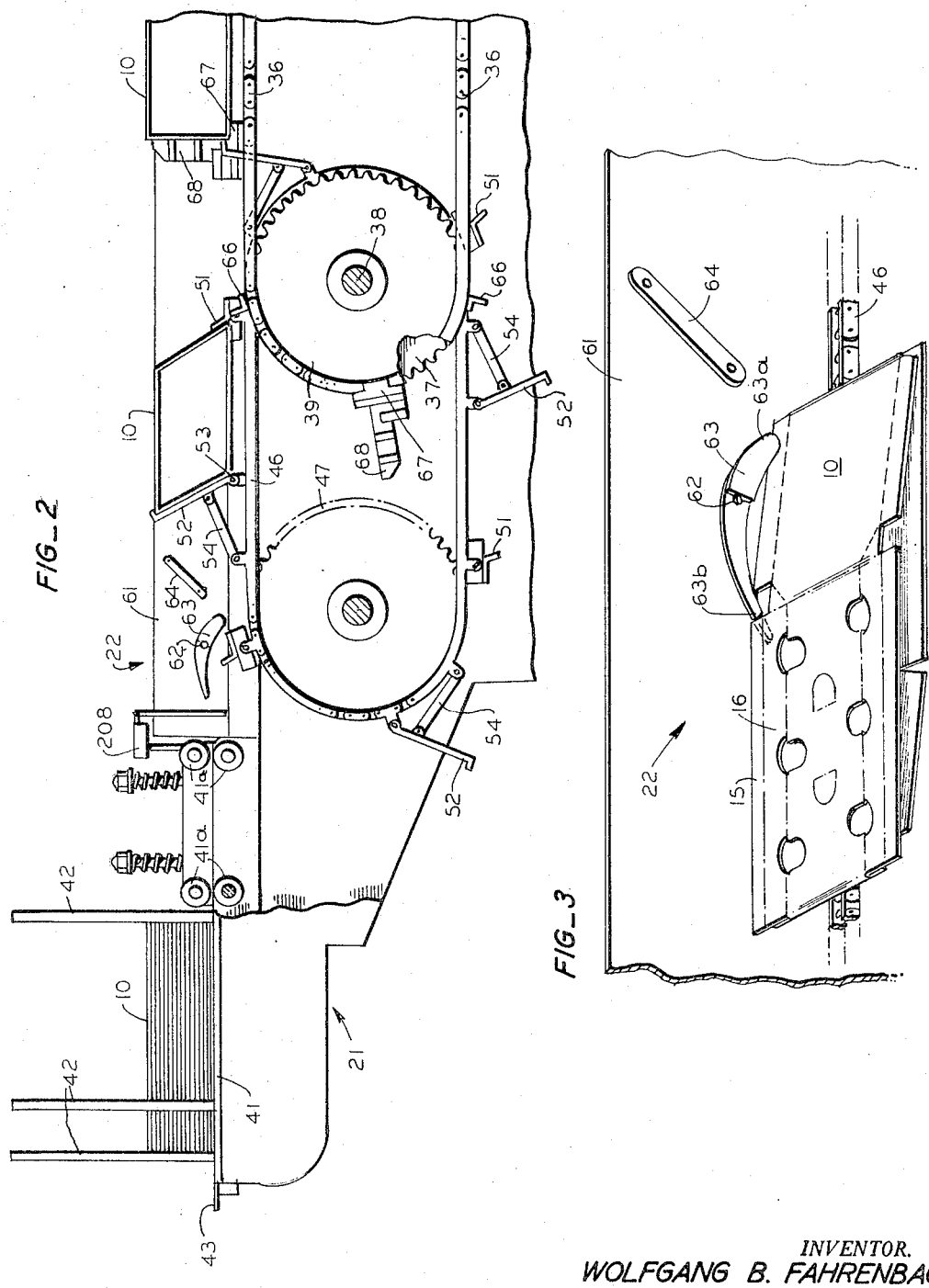

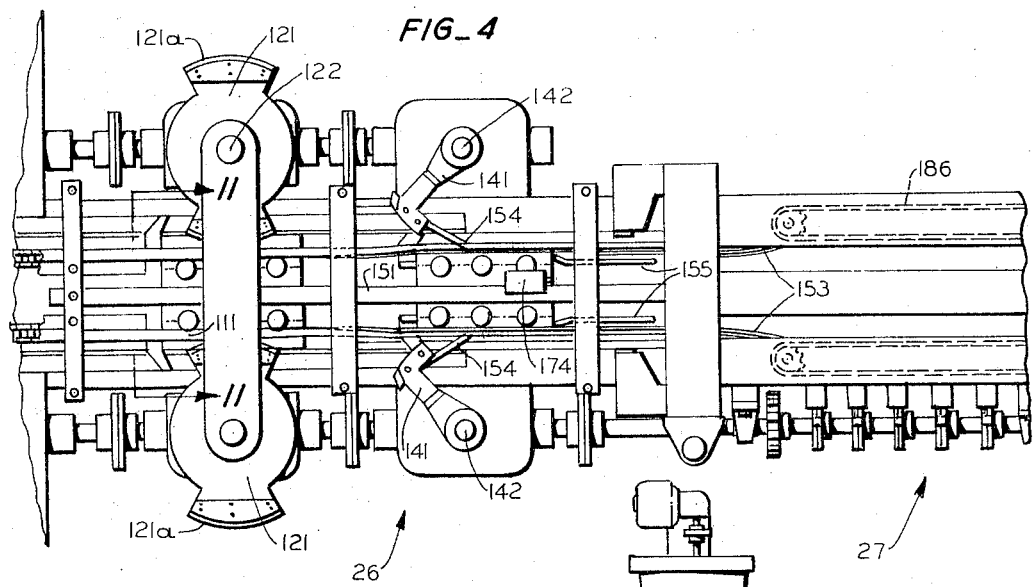
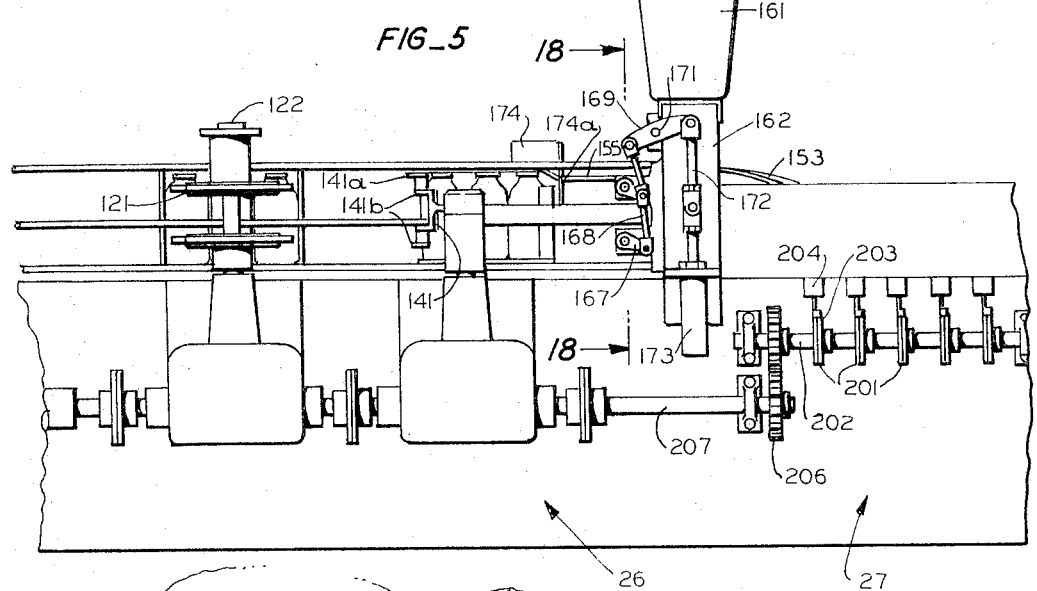
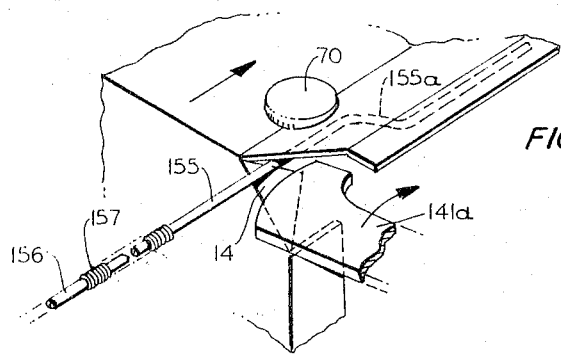

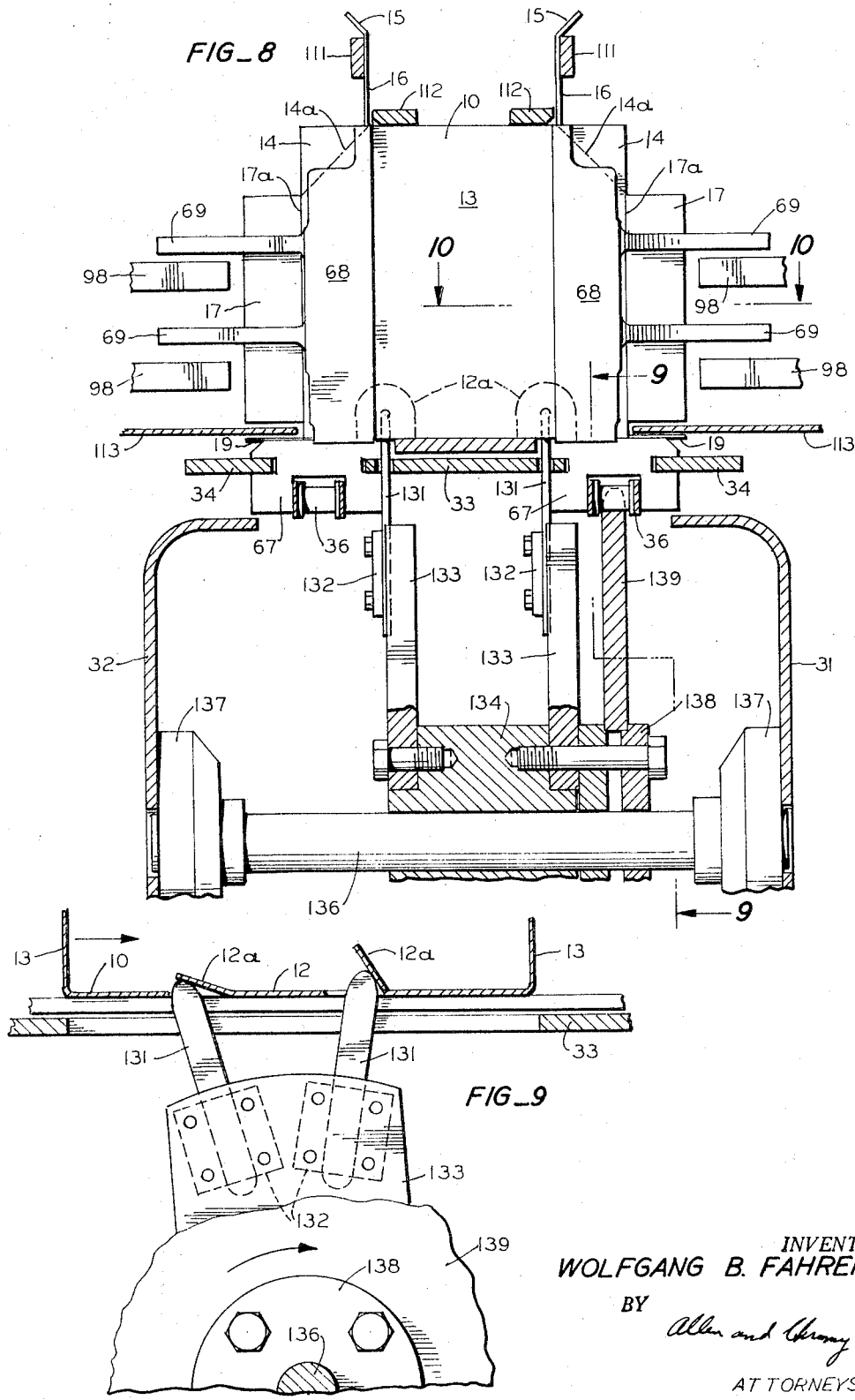

Jan. 31, 1967  W. B. FAHRENBACH  3,300,947
CARTON CLOSING MACHINE
Filed May 1, 1961  12 Sheets-Sheet 6
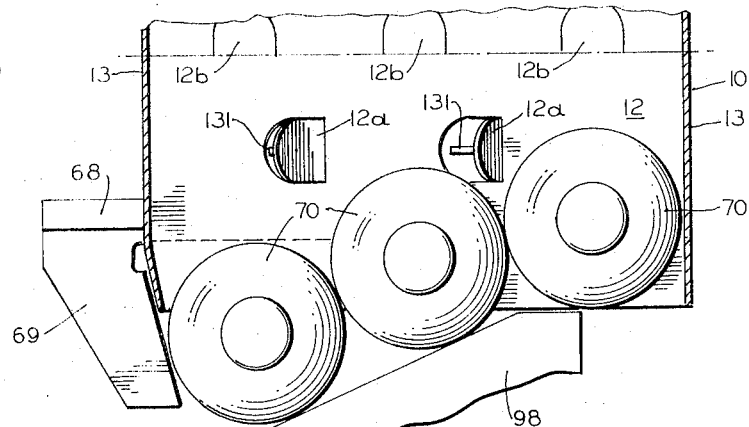
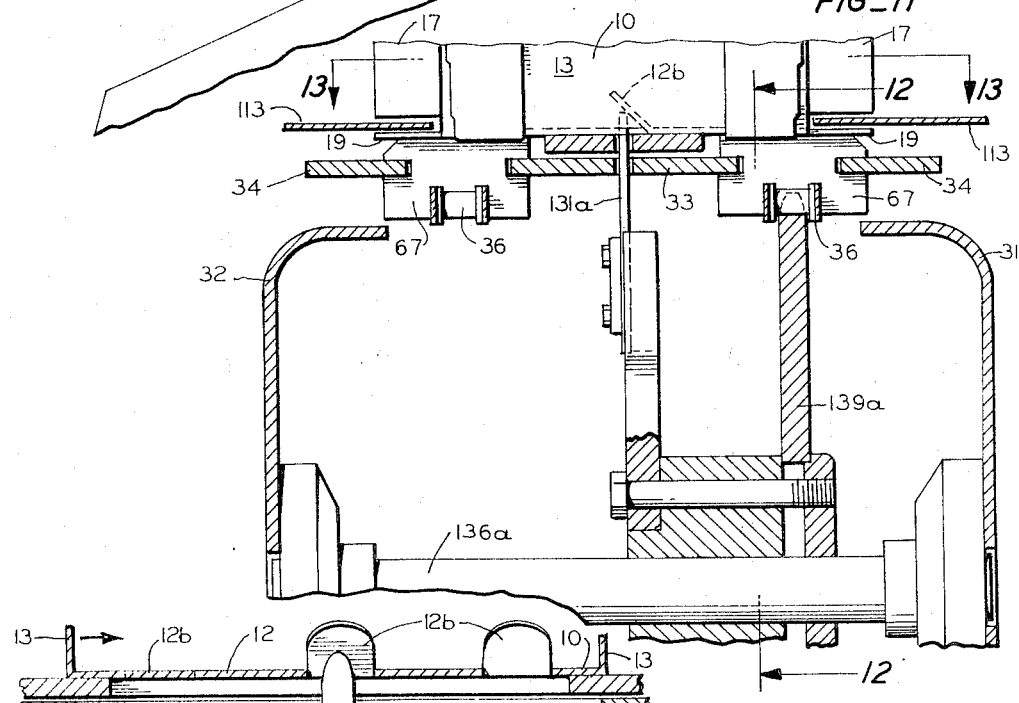
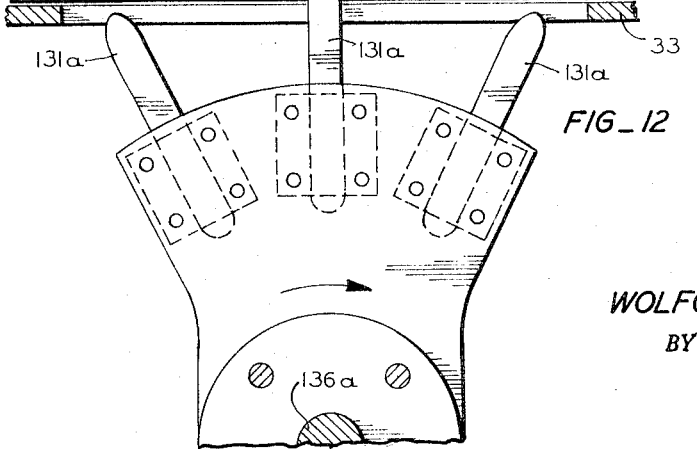
INVENTOR.
WOLFGANG B. FAHRENBACH
BY
*Allen and Chromy*
ATTORNEYS Jan. 31, 1967  W. B. FAHRENBACH  3,300,947
CARTON CLOSING MACHINE
Filed May 1, 1961  12 Sheets-Sheet 7
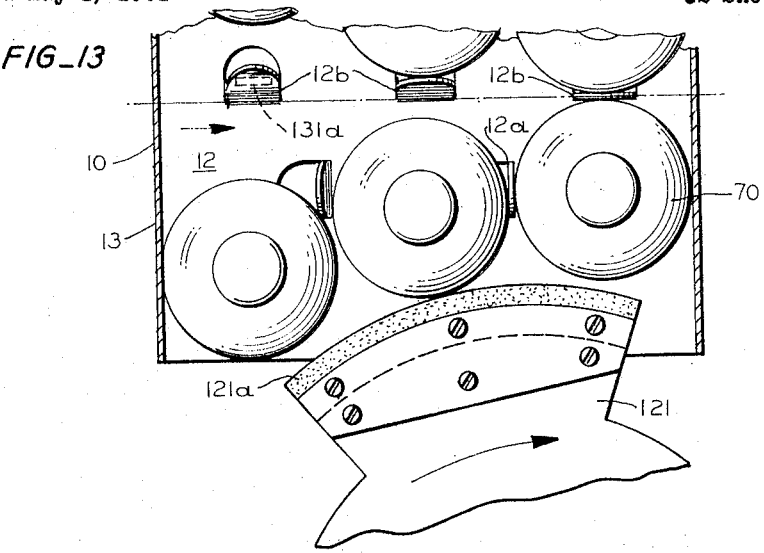
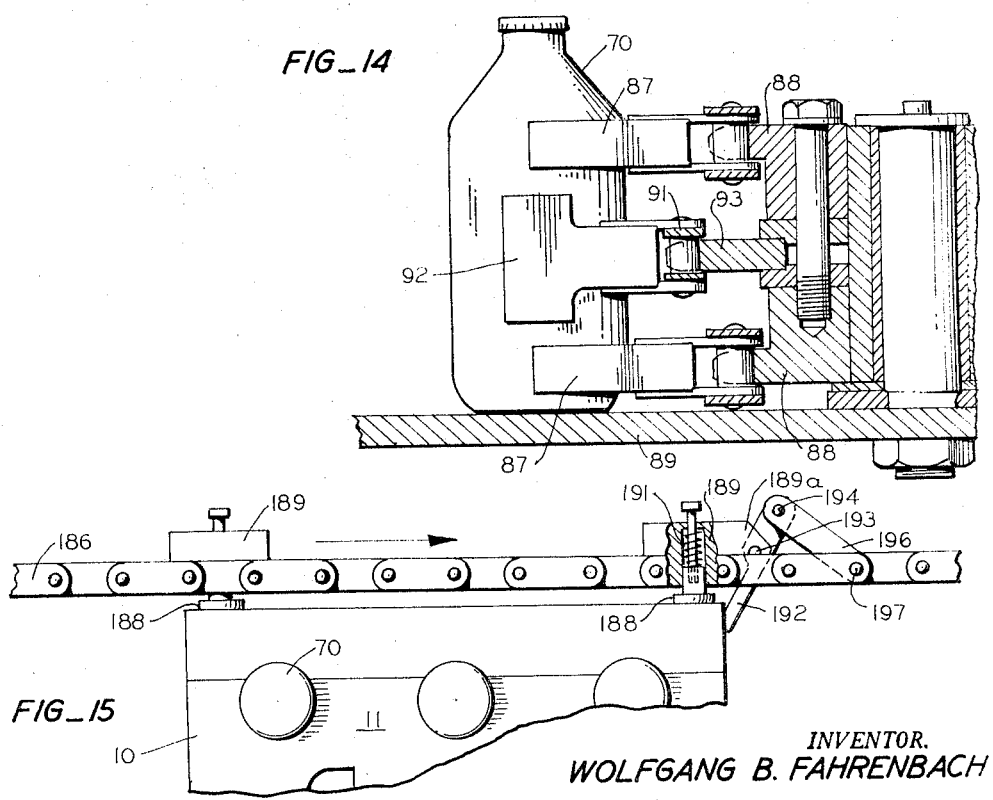
INVENTOR.
WOLFGANG B. FAHRENBACH
BY
ATTORNEYS

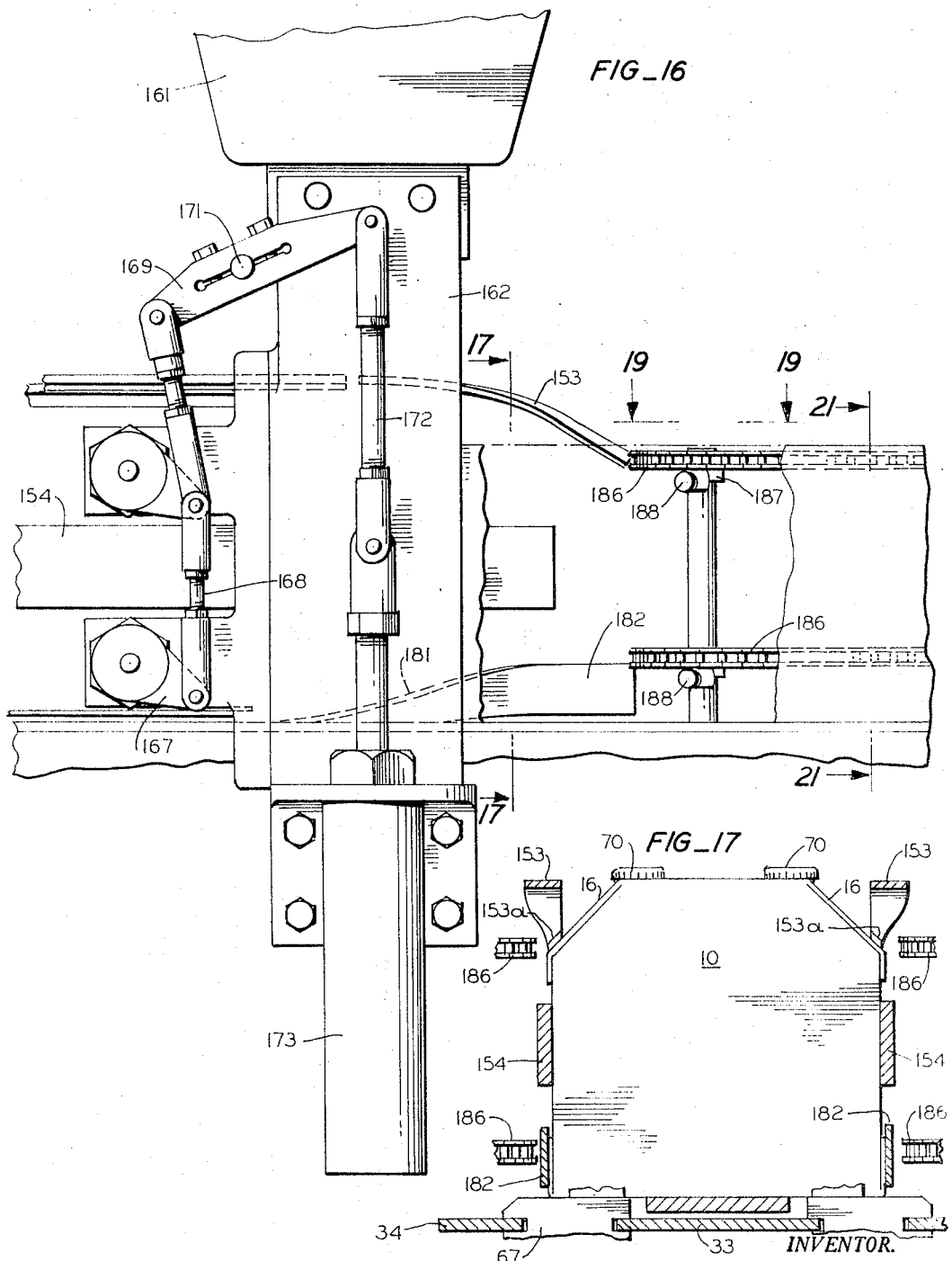

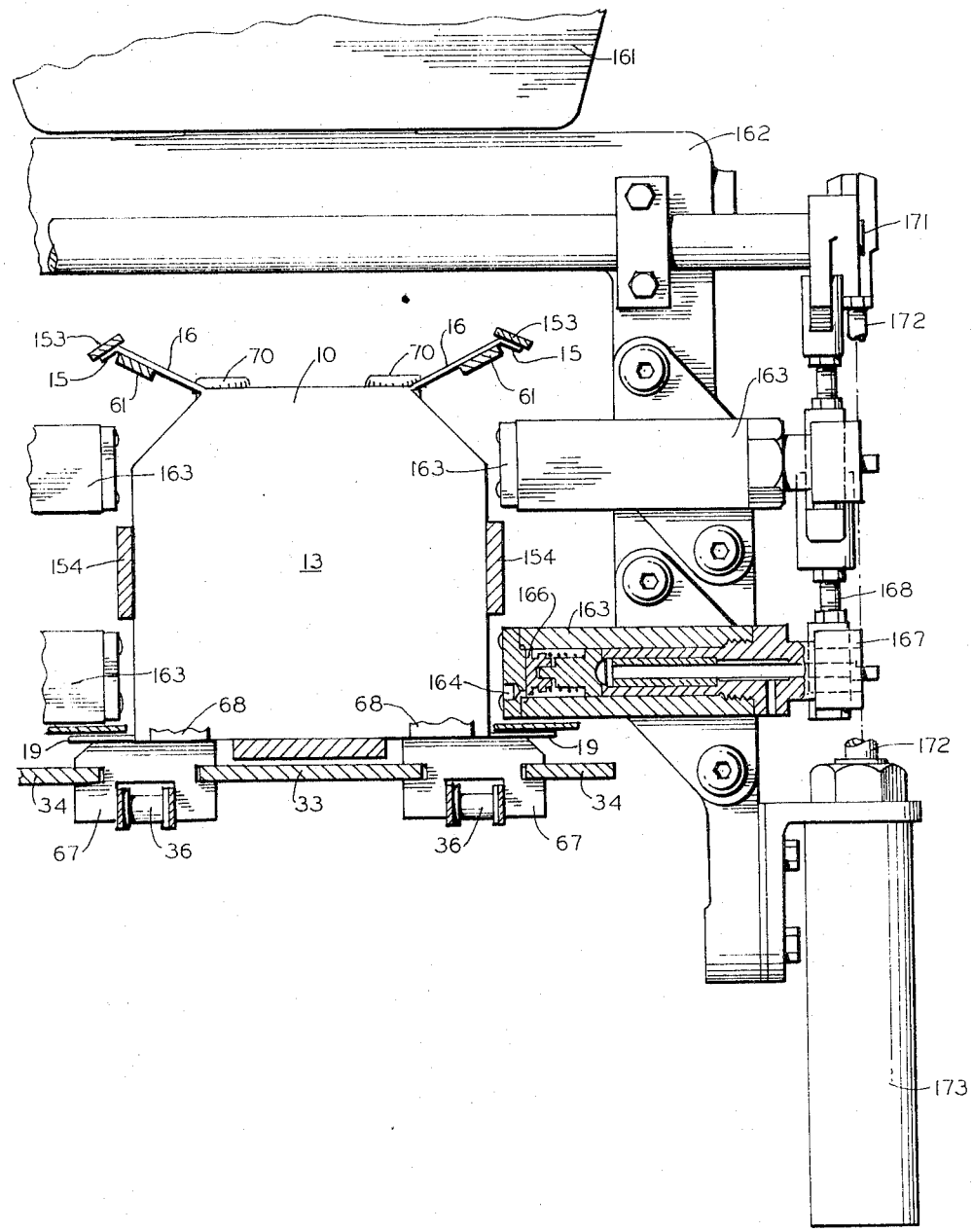

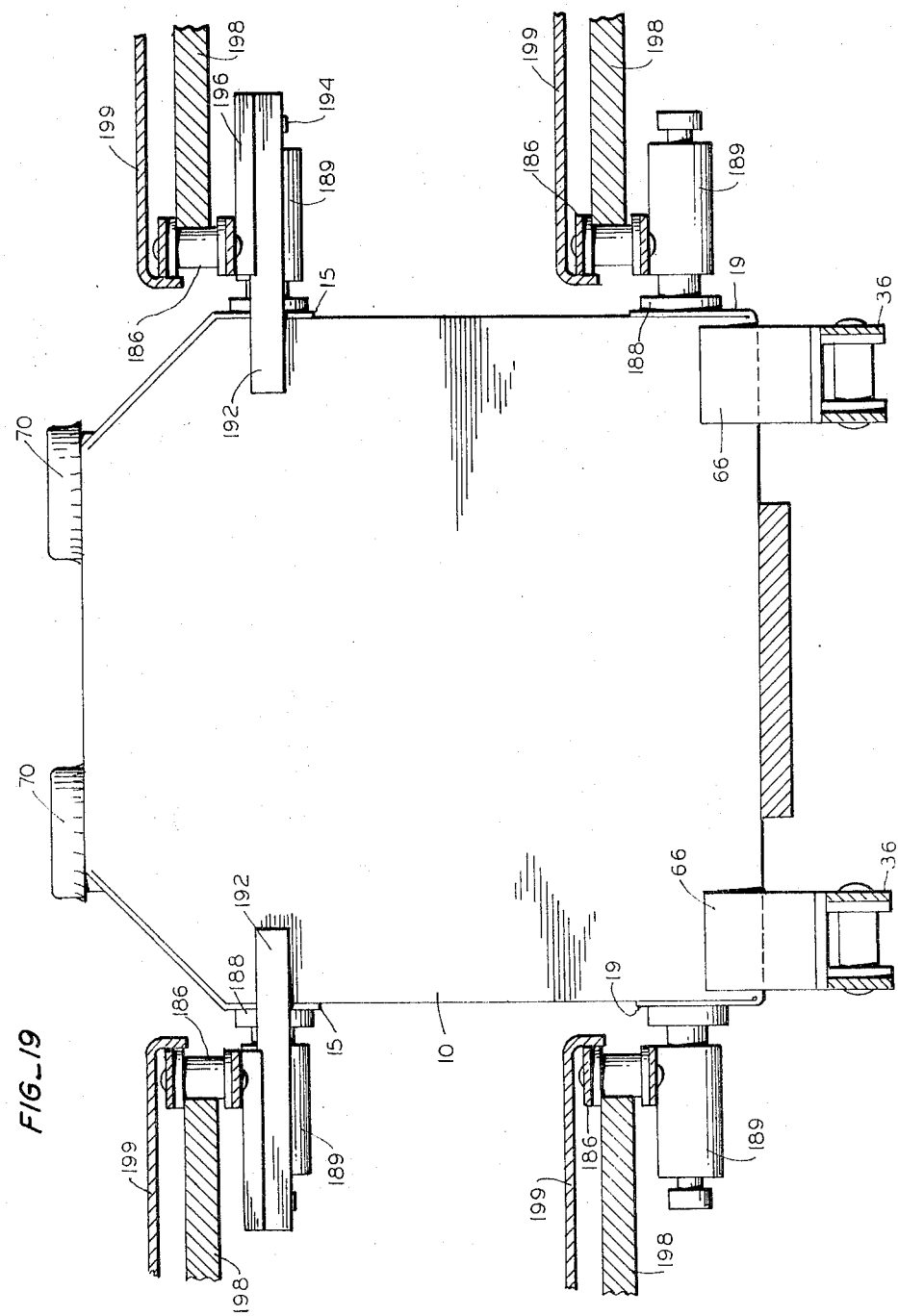

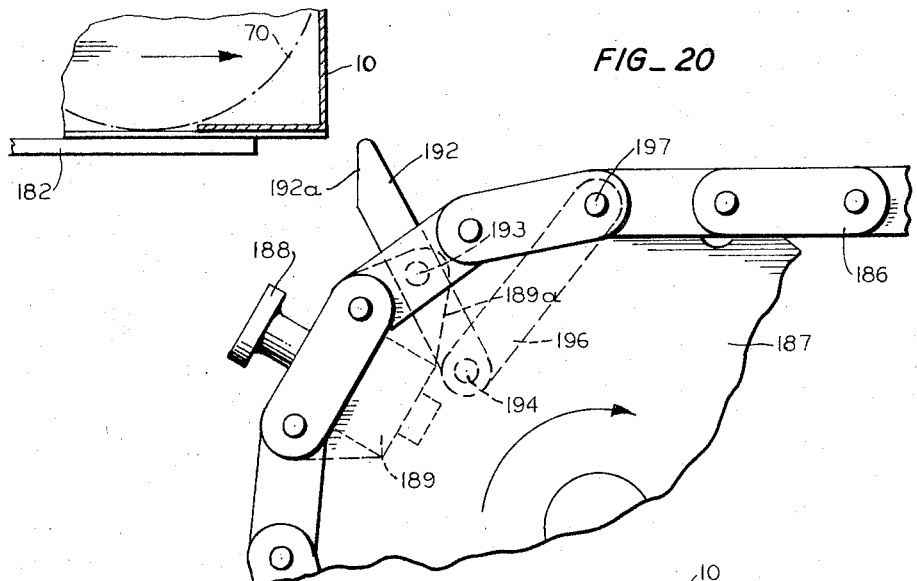
FIG_20
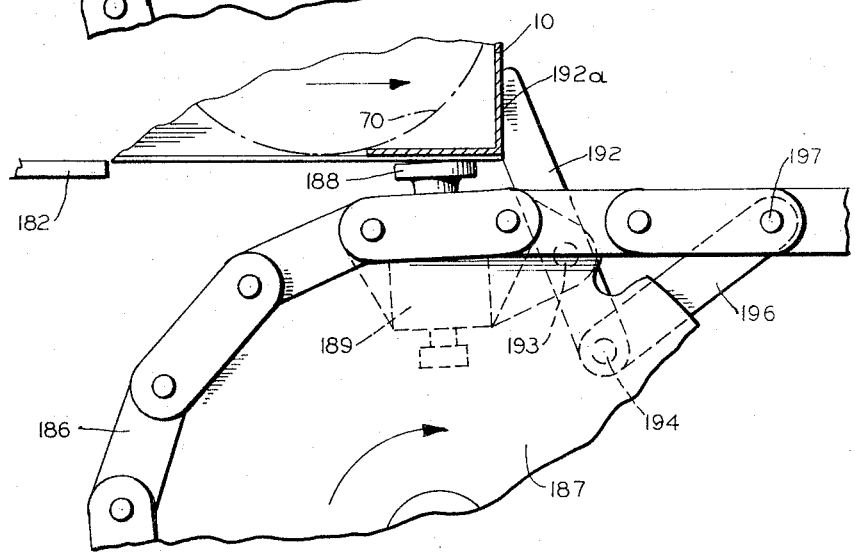
FIG_21

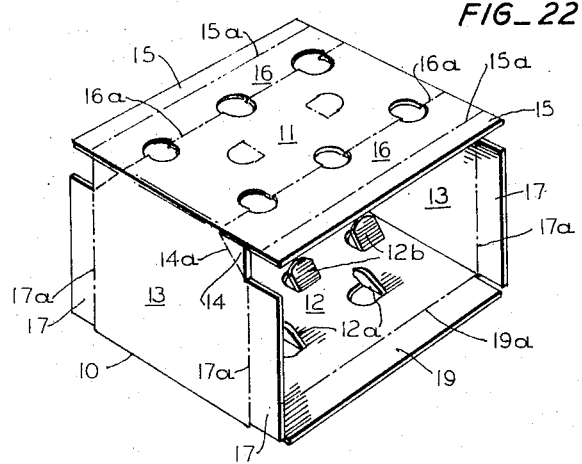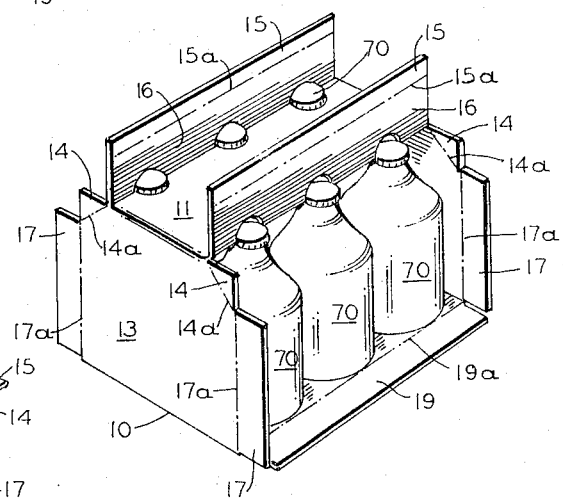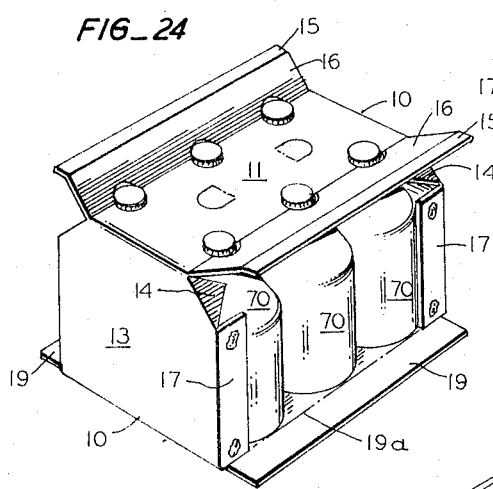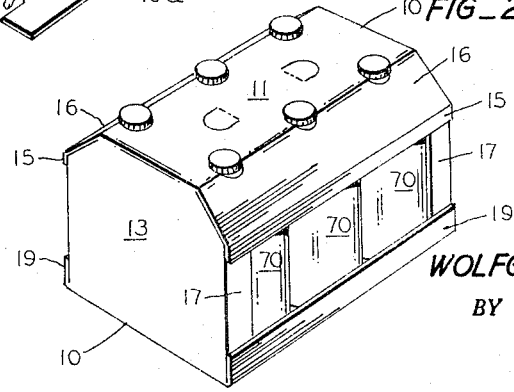

3,300,947
CARTON CLOSING MACHINE
Wolfgang B. Fahrenbach, Oakland, Calif., assignor, by mesne assignments, to King-O-Matic Equipment Corporation, San Francisco, Calif., a corporation of California
Filed May 1, 1961, Ser. No. 106,753
10 Claims. (Cl. 53—186)

The present invention relates to the packing of containers such as bottles in a carton, and relates more particularly to the erecting, filling and closing of cartons of the collapsing type to place a plurality of bottles therein and to close the cartons.

In the production of packages of containers such as cartons of beer, a common practice is to provide a carton capable of containing a plurality of containers, such as bottles of beer, for example, six in number, and to automatically open the carton to an erect position, to maintain the side flaps of the carton open, to introduce the bottles automatically, and then to close and seal the carton, care being taken to insure gentle handling of the containers such as bottles, so as to avoid breakage. These cartons are commonly of the type providing a view of the containers inside the package at either the sides or the ends thereof, the bottles being retained by suitable side flaps along the bottoms and tops thereof. The automatic handling of such casing or packing of the cartons with bottles involves problems in the production of an efficient machine and method to provide a high capacity, and at the same time to insure gentle handling of the product.

It is the general object of the invention to provide an improved machine for packaging a plurality of containers in a carton.

Another general object of the invention is to provide a machine of the above character which is adapted for use with the so-called view-pack cartons of the type providing sight of the articles packaged from the sides or ends of the carton.

A further object of the invention is to provide an improved mechanism for feeding the bottles in groups into the container automatically as the two are moving along together in continuous fashion.

Another object of the invention is to provide an improved sequence of the folding of the flaps which are used to retain the bottles in the carton, and to insure closing of the carton.

Another object of the invention is to provide an improved "live" or spring-loaded closing guides for certain flaps of the carton in the carton closing operation.

A further object of the invention is to provide an improved means for controlling the erecting of the tabs in the bottom of the carton which are placed between adjacent bottles so as to prevent breaking the bottles, and to control this erection, both by the automatic mechanism provided therefor and by the use of the bottles being introduced into the carton.

Another object of the invention is to provide an improved compression mechanism for holding the carton being glued until the glue is set.

Still another object of the invention is to provide a compression mechanism which includes controlling the shape of the carton at the time of gluing so as to insure a rectangular shape thereof.

Another object of the invention is to provide an improved compression mechanism wherein the pressure is localized to the spots of glue which must be set.

Still another object of the invention is to provide a compression mechanism in which the localized pressure applied to the spots of glue moves along with the cartons during the application of pressure.

Another object of the invention is to provide a machine incorporating the foregoing objects in which the glue is applied as a spray while the cartons are moving along its path.

A still further object of the invention is to provide a safety lock mechanism on the bottle feed and a timing control thereof whereby the grouping of bottles is not interrupted by the act of stopping the bottle feed for purposes of inspection or repair, and where the timing of the grouping is insured where the bottle feed is again made operative.

The above and other objects of the invention will be apparent from the following description of a preferred embodiment of the invention, as illustrated in the accompanying drawings, in which:

FIG. 1 is a plan view of the feed end of the bottle casing machine;

FIG. 2 is a longitudinal sectional elevation taken in planes indicated by the lines 2—2 in FIG. 1;

FIG. 3 is a perspective view of a portion of FIG. 2 illustrating the operation of erecting a carton;

FIG. 4 is a fragmentary plan view of an intermediate portion of the machine, being taken immediately to the right of FIG. 1;

FIG. 4a is a detail perspective view of the spring mounted plow and associated parts;

FIG. 5 is a side elevational view of the mechanism shown in FIG. 4;

FIG. 6 is an enlarged plan view of the bottle stop or sprocket shown in FIG. 1;

FIG. 7 is a side elevational view of the mechanism shown in FIG. 6;

FIG. 8 is a transverse fragmentary sectional view taken in a plane indicated by the line 8—8 in FIG. 1 and illustrating the operation of erecting certain separator flaps;

FIG. 9 is a fragmentary sectional view taken in the plane indicated by the line 9—9 in FIG. 8;

FIG. 10 is a fragmentary plan view illustrating the operation of erecting certain separator flaps taken as indicated by the line 10—10 in FIG. 8;

FIG. 11 is a transverse sectional view taken in the plane indicated by the line 11—11 in FIG. 4;

FIG. 12 is a fragmentary sectional elevation taken in the plane indicated by the line 12—12 of FIG. 11 and also illustrating the erection of the separator flaps;

FIG. 13 is a fragmentary sectional plan view taken in the plane indicated by the line 13—13 in FIG. 11;

FIG. 14 is a fragmentary enlarged sectional view taken in the plane indicated by the line 14—14 in FIG. 1;

FIG. 15 is a fragmentary plan view of a portion of FIG. 4 showing the holding of the carton during the setting of the glue;

FIG. 16 is a side elevational view of a portion of FIG. 5, but shown in enlarged fashion;

FIG. 17 is a fragmentary transverse section taken in a plane indicated by the line 17—17 in FIG. 16;

FIG. 18 is a fragmentary transverse sectional view taken in a plane indicated by the line 18—18 in FIG. 5;

FIG. 19 is another fragmentary transverse sectional view taken in a plane indicated by the line 19—19 in FIG. 16;

FIG. 20 is a fragmentary enlarged plan view illustrating the operation of the carton squaring and compression holding means of the invention;

FIG. 21 is an operational view similar to FIG. 20 illustrating the operation at a subsequent time after the carton has been engaged and erected by the carton erecting and holding means during the glue setting cycle operation;

FIG. 22 is a perspective view of the carton adapted to be filled and closed by the present machine and method of the present invention;

FIG. 23 is a view of the carton with the bottles placed therein and before the closing of the retaining flaps;

FIG. 24 is a perspective view taken shortly after the condition of the carton shown in FIG. 21 and showing the various flaps partially closed, the side flaps having had the glue applied to them;

FIG. 25 is a view of the carton in its filled and closed condition.

To enable a better understanding of the invention, a brief description of the carton preferably employed with the machine will be described. In general, the carton 10 (FIGS. 22–25) which is symmetrical from side to side includes a narrow top panel 11, a full width bottom panel 12 and respective end panels 13, one end of the bottom panel being attached by a glued flap to the adjacent end panel in a conventional manner. These four panels are connected by respective bend lines so that they form a continuous series. Top panel 11 has side flaps or panel portions 16 at either side attached thereto by a bend line 16a so that they can be bent downwardly at an inclined position to complete the entire top with the narrow top panel 11. The edges of these top panel portions 16 have flap portions 15 connected thereto by bend lines 15a for a purpose later described. The end panels 13 have respective side glue flaps 17 connected thereto by bend lines 17a and adapted to be bent at right angles as shown in FIG. 24 to receive spots of glue 18 for attachment respectively to the side flaps 15 and side flaps 19 at either side of the bottom panel. The side flaps 19 are connected to the bottom panel 12 by suitable bend lines 19a. Also, each end wall 13 of the carton has respective triangular tabs 14 at the upper edges thereof joined to the panel 13 by respective bend lines 14a so that when these triangular tabs 14 are bent inwardly as indicated for example in FIG. 4, the bend lines 14a at the upper diagonal edge of the carton form a seat for the adjacent portion of the side panel 16. When the carton is filled and closed, it is in a condition shown in FIG. 25. At the beginning of the operation it is flat with the folded adjacent portion of the bottom panel and an adjacent end panel in leading position as shown in FIG. 3 for example.

In general, the machine comprises a carton feed station 21 (FIGS. 1 and 2) of conventional construction which is adapted to receive a stack of folded cartons, and eject these cartons one by one to a carton erecting mechanism 22 which is the next mechanism in the line of operation. From the carton erecting mechanism 22, the erected cartons are carried past a bottle grouping and feed station 23 (FIG. 1) by means of which a group of three bottles are introduced from each side into the carton. At the time the bottles are being introduced into the carton, a carton separator erector mechanism comes into play to place the separators in active position. Then the carton with the bottles therein is carried past a carton flap closing station 24 which performs the preliminary folding of the side flaps to prepare them for the gluing operation and then these flaps are glued and closed at a gluing and closing station 26, FIG. 4, after which they are passed to a holding station 27, and held for the necessary short time until the glue is set to complete the carton filling and closing operation.

These various mechanism will be described in sequence. The frame and drive mechanism of the present invention is of the type disclosed in the co-pending application of McGihon Serial No. 485,943, filed Feb. 3, 1955, to which reference is made for the frame and drive mechanism as well as other conventional parts fully disclosed therein and not described in detail herein.

For the purposes of understanding the present invention, it is sufficient to say that the frame comprises respective similar opposed channel-shaped sheet metal frame portions of side members 31 and 32 (FIGS. 1 and 8) which are suitably connected in a rigid fashion by crosspieces or members at various points along their length. The various crosspieces also provide a support for a central raised pad portion 33 on which respective tracks or plates 34 and 35 may be mounted for purposes later described. The drive mechanism includes two main conveyor chains 36 trained about suitable sprockets including idler sprockets 37 (FIG. 2) on a shaft 38, common to a central sprocket 39 which forms a part of the carton erecting mechanism. These parts are all similar in construction with those fully disclosed in said application Serial No. 485,943.

*Carton feed mechanism*

The carton feed mechanism is of the conventional type and is fully disclosed in the co-pending application of Leonard McGihon Serial No. 485,943 identified above. Generally, it comprises a platform 41 (FIGS. 1 and 2) supported on the frame members which at its top provides a support for a stack of cartons 10, together with upright rods 42 and a carton feed slide 43, all as disclosed in said application. The feed slide 43 is adapted to engage and remove the lowest carton 10 of a stack to bring it into engagement with a set of rubber ejecting rolls 41a, so as to pass the carton on to the carton erecting chain 46 carried by the sprockets 39 and 47. The carton erecting means includes a leading element 51 secured on a special link of the chain and a trailing lifting arm 52 which is pivoted at 53 on a link of the chain and is connected by a supporting strap 54 to another such link. These parts are all as shown and described in said application.

In order to insure the breaking of the carton and its erection to open condition as shown in the middle of FIG. 2 for example, certain special parts are provided to assist in this operation. In the following description only one of two similar pairs of parts on opposite sides of the machine will be described.

As shown in FIGS. 2 and 3, a side wall 61 has freely pivoted thereon at 62 a weighted bellcrank 63 whose heavy end 63a normally lies in the path of a carton being ejected from the rolls 41. As a carton passes beneath the end 63a, it will rock the lever or bellcrank in a counterclockwise direction so as to place a curved nose 63b thereof into position to ride underneath the adjacent side flap portion 16 so as to effect a lifting operation on this side flap portion. This occurs while the end of the carton is engaged with the leading stop member 51 and the bellcrank 63 leads the adjacent and cooperating flap 16 onto an inclined rail 64 on the sidewall 61 so that the opening of the carton by the trailing erecting arm 52 is aided in its successful erection to the position shown in the center of FIG. 2.

The carton is conveyed along in this position between the carton erecting members 51 and 52 associated therewith until it is picked up by the carton feed mechanism of the machine and each carton is transferred from the carton erecting chain to the main conveyor chain as fully disclosed in said application.

In brief, each chain 36 on an L-shaped stop 66 for engaging the leading end of a carton associated therewith. Each chain 36 also carries on one of its link a block 67 which carries an upright carton erecting and propelling arm 68 for engaging the rear wall of the carton as described in said application. Each carton erecting and propelling arm 68 (FIG. 8) has a pair of laterally extending arms 69, and the block 67 is slotted at its side to engage a side guide plate 33 at its inner edge and a side guide plate 34 at its outer edge, these plates being spaced above and mutually supported on the adjacent flange of a side channel 31 or 32 respectively.

It will be seen therefore and an open erected carton is held in open condition and is conveyed along steadily at the speed of the chains 36 so that all of the operation performed on the carton including the filling, closing and sealing etc. are performed while the carton is moving continuously along as will be described.

In describing the various mechanisms to follow, because in many instances there are duplicate parts or similar right and left hand parts on the respective sides of the machine, only one side will be described and it will be understood that the other side is constructed and operates in a similar manner.

Bottle feed mechanism

The bottle feed mechanism comprises generally a pair of opposite single file bottle conveyors 81 (FIG. 1) which may be of the conventional flat top nylon chain type, and each conveyor has side rails 80 associated therewith. These conveyors 81 are suitably mounted on the machine and driven to provide a speed at least 10% higher than the equivalent speed of the chains 36 which convey the carton.

Adjacent the discharge end of each conveyor 81 there is provided a bottle stop mechanism (FIGS. 1, 6 and 7), which includes an upper sprocket 71, and a lower sprocket 72 of smaller diameter, both carried by shaft 73 suitably journaled on the frame extension 89. These sprockets 71 and 72 are contoured respectively to fit the upper neck portion of a bottle and the lower rounded portion of a bottle, the sprockets 71 and 72 being driven by the bottles as they flow therepast. Sprockets 71 and 72 are stop sprockets by virtue of a lug 73a, carried by the shaft 73 and normally passing free of a stop plunger comprising a ring 74, a rubber disc 76 carried by a piston rod 77, the piston rod 77 extending within a hydraulic cylinder 78 having a conventional piston therein. As long as the bottles are flowing freely into and through the machine and the hydraulic cylinder 78 is not activated, the sprockets 71 and 72 merely turn as the bottles pass. Whenever the hydraulic pressure is placed in the cylinder 78, it projects the disc 74 to its dotted line position shown in FIG. 6 so that at a given portion of the cycle of the sprocket, the lug 73a will be stopped in a gentle fashion by the disc 74. This gentle stop is accomplished in part by the resilience of the rubber disc 76 and in part by the resilience of the liquid within the piston 78. As will be explained later, when the impedance is removed, i.e. when the control is exercised to release the pressure from the chamber 78, this pressure is not released until the other cooperating parts with the sprockets 71 and 72 are in the proper timed relation to receive another bottle, the sprockets in the meantime acting as a positive stop to further feed of the bottles 70 by the conveyors 81, the conveyor merely sliding idly underneath the bottles.

The discharge end of each conveyor 81 (FIG. 1) terminates underneath a starwheel 82 carried by a shaft 83 supported on a bracket 84, this starwheel 82 is driven by the bottles 70 and comprises means for diverting each container 70 laterally from the conveyor and outwardly of the machine into a singling conveyor 86 comprising upper and lower chains which have a series of nylon projections 87 with tapered ends 87a and spaced apart slightly over the diameter of a bottle. The direction of the taper is such as to assist feed of a bottle or container 70 into each pocket of the singling conveyor chains 86. The chains 86 are trained about suitable upper and lower idler and driving sprockets 88 and 88a carried by suitable shafts on a platform 89 attached to the adjacent frame. This singling conveyor 86 is driven at a sufficiently higher speed than the platform conveyor 81 so that the bottles arrive synchronously at the various pockets of the singling chain to be driven thereby and discharged into a gathering mechanism or conveyor 91 having four projections or propelling lugs 92 thereon also of a suitable soft material such as nylon and trained about a sprocket 93 (FIGS. 1 and 14) coaxial and driven with the sprockets 88, and about a larger sprocket 94 (FIG. 1) carried by a drive shaft 96 suitably driven from the main drive mechanism and spaced above the platform 89. The rate of speed of the gathering chain 91 is such that it only has one lug or projection for every three bottles so that the bottles are gathered three by three by each lug as illustrated in FIG. 1 and are conveyed along in the inclined path converging with the path of the cartons 10 defined by inner guard rail 97 and by one stretch of the chain 91. This path is continued by a rail 98.

Bottle entry into carton

In order to enable entry of the bottles into a carton, the upper flaps 16 are elevated to an upright position being bent about their respective bend or hinge lines 16a to the top panel 11 of the carton. The means performing this operation comprise a pair of plows 111 (FIG. 1) having their forward ends 111a (which encounter the carton first) at the proper elevation and spaced laterally to enter beneath the flaps 16 (FIG. 22), and then converge inwardly and upwardly to a straight run portion 111b (FIGS. 1 and 8) where the flaps are held in raised position (FIG. 23) at an elevation so as to provide free access for the neck of the bottle into the openings 15 in the top of the carton, the cap of the bottle projecting slightly above the top panel 11 and thus being held in by the later closing of these top flaps 16. At the time this is happening the carton is riding underneath a pair of fixed rails 112 (FIGS. 1 and 11) which cooperate in maintaining the shape of the carton while the flaps 16 are being folded upwardly by the plows 111.

Also, as the carton is received by the main conveyor chains 36, the respective lower flaps 19 on the bottom panel 12 of the carton ride beneath a pair of lift shield or platform 113 (FIGS. 1 and 8) so that they are held down for entry of the bottles thereover.

Referring to FIG. 1, it will be noted that the rail 98 has its trailing end positioned so as to just clear the extended side flaps 12 of the carton 10 so that the containers or bottles are partially introduced into the container and are placed on the platform 113 in front of the conveying arms 69 of the carton station. Subsequently the three containers 70 shown at the right of FIG. 1 will be conveyed along by the carton station until their partial entry into the carton is completed.

The means for completing the entry of a group of containers into the carton comprises a pair of vertically spaced cam members 121 (FIGS. 4 and 13) each carried by a shaft 122 suitably journaled and driven on the machine and having respective opposite rubber cam sections 121a arranged in pairs and spaced 180 degrees apart and adapted to successively enter groups of three containers into end carton and to complete the entry into the cartons as shown in FIGS. 4 and 13.

Seperator flap control

As previously described, the bottom panel 12 of the carton 10 has respective sets of separator flaps designated 12a and 12b respectively, the flaps 12a being in pairs as seen in FIGS. 9 and 12 and extending transversely of the carton, and the flaps 12b being arranged in a row of three and extending longitudinally of the carton as seen most clearly in FIGS. 10 and 11.

The flap erecting mechanism for the flaps 12a, which are erected first, comprises a pair of spring fingers 131 (FIGS. 8 and 9) which are clamped by brackets 132 to an upstanding arm 133 carried by a hub 134 secured on a transverse shaft 136 and journaled in respective bearings 137 secured to the respective side plates 31 and 32. The shaft 136 carries by means of clamping discs 138 a sprocket 139 which meshes with one of the main conveyor chains 36 to drive the separator flap erector fingers in synchronism, the fingers 131 being spaced and timed in operation so that the erection of the flaps 12a is occurring as the bottles 70 are entering the carton 10 as illustrated in FIG. 10 so that as a flap 12a is erected it is immediately embraced by a pair of adjacent containers 70 so as to be maintained in erected position.

Therefore, during the first partial entry of the bottles into a carton as shown in FIG. 10 by the rail 98, the adjacent pair of separator flaps 12a are erected just in time to be maintained in position by the bottles. At a subsequent position along the travel of the carton with the bottles partially therein, and just ahead of the operation of the cam members 121, the second series of three separator flaps 12b are erected by second series of fingers 131a (FIGS. 8 and 10) carried by a shaft 136a and driven similarly by the chain 36 through a sprocket 139a. Again the timing of the erection of the flaps is such that as they are being erected the bottles are being moved to their final position in the carton so as to maintain the separator flaps in erected position, this operation being clearly illustrated in FIG. 13 where two of the flaps 12b have been erected, and the erection of the third flap 12b is about to start.

From the above description it will be seen that the interior of the carton is fully conditioned by the above operation, the bottles have been placed therein as far as they can with their necks in the apertures so that the carton with the bottles or containers therein is ready for the closing operation.

*Preliminary carton closing*

Preliminary flap breaking of the side flaps of the carton is effected by means for folding to closed position, and one of these means comprises an arm 141 (FIGS. 4 and 5) carried by the shaft 142 and operating in time with the other parts to strike the trailing flaps 14 and 17 with extensions 141a and 141b of arm 141. This folding of the flaps 14 and the preliminary folding of the flaps 17 occur just ahead of the entry of the carton into engagement with a pair of side rails which serve to maintain the side flaps 17 in their folded position, and also to effect folding of the leading side flaps 17. At about this time also, a suitable pair of guide rods 155, each of which is mounted in floating or resilient manner on a frame portion 156 by means of a spring 157, and the respective rods 155 converge inwardly and downwardly as seen in FIGS. 4 and 5 to control the position of the tabs 14, contact leading triangular flaps 14 and break them into position beneath the side extensions or portions 16 of the top panel 11. Therefore, the four side flaps 17 on the carton are in their final position, and the four triangular tabs 14 are broken into position to be folded in their final position when the top panel portions 16 are lowered.

It will be noted at this time that the rails 112 have terminated adjacent the point of final entry of the bottles into the carton and have been replaced by an overlapping single top center rail 151 (FIG. 4) which holds the carton securely on its carriage. Also the upper rails 111 holding the top panel side portions 16 upright bend down and out to the position of FIG. 18 and cooperate with an upper plow 153 to control the side flap portions 16 as seen in this view and also in FIG. 24 while the carton is being carried through the gluing station. The plows 153 bend down the glue flap portions 15. Also, the rails 154 are gripping the sides of the cartons and holding the vertical side flaps 17 in closed position ready for the application of glue, the lower side flaps still being retained by the plates 113 so that they are out of the way of the application of glue.

*Gluing station*

The gluing station is of conventional construction and comprises a glue pot 161 where a supply of glue is maintained at the proper temperature, a portal member or pressure pot 162 (FIGS. 4, 5 and 18) within which glue is maintained under pressure for application by four glue nozzles 163. The glue nozzle assembly is of conventional construction so that it will be only briefly described. With reference to FIG. 18 it will be seen that the nozzle shown in section comprises nozzle opening 164 which is controlled by an apertured rotary plate 166 which is attached to and operated in a suitable fashion by a lever arm 167. The lever arms 167 are connected by linkage 168 to an operating lever 169 which is pivoted at 171 and is connected by a connecting rod 172 to an actuating cylinder 173. This cylinder being actuated twice for each carton when it is desired to cause spraying from all four nozzles simultaneously so that two spots of glue will be deposited on each vertical side flap 17 as shown in FIG. 24 on either side of the carton, ready for folding up of the bottom flap and folding down of the top flap into cooperative relation therewith. The operation of the cylinder 173 is triggered by a microswitch 174 having a depending operating arm 174a lying in the path of the carton. The timing of the parts is such that the triggering of the gluing mechanism at this location ahead of the travel of the carton will cause the glue to be applied two times from each pair of glue nozzles on either side in timed relation to place the glue in the position shown in FIG. 24.

*Final carton closing*

The upper side flap 16 and the lower side flaps 19 are released immediately after they pass the gluing point, and immediately the lower side flaps 19 encounter a pair of plows 181 (FIG. 16) continuing in rails 182 which fold up the bottom side flaps 19. Also the top side flaps 16 encounter a pair of plows 183 which cause them to be folded downwardly and the glue flap 15 to be applied against the glue on the vertical side flaps 17.

As explained above, the plows 153 and 181 condition the respective upper and lower side flaps 16 and 19 together with the glue flaps 15 for a holding in the compression operation which is immediately brought into play, together with a means for squaring the cartons before the time the glue begins to set and to hold them square during their travel through a traveling compression mechanism.

As seen in FIGS. 4, 15, 19, 20 and 21, a set of four horizontal disposed chains or conveyors are provided which are trained about respective horizontally disposed idler sprockets 187, and suitable driving sprockets (not shown). Thus an upper and lower chain is provided at each side traveling adjacent the line of travel of the spots of glue on the carton, and these chains 186 carry spot pressure elements in the form of pressure buttons 188 at the proper intervals to engage an associated flap in alignment with a spot of glue. Eight pressure buttons are provided for each carton. As seen in FIG. 15, each button 188 is carried in a fitting 189 and is urged outwardly by a spring 191. Each of upper pair of buttons 188 at the leading end of a carton and respective cooperating fingers 192 FIG. 20) serve to square the carton in cooperation with the carton holding means of the carton conveyor. The alternate trailing buttons 188 have no function in the squaring of the carton and only apply pressure at the aligned glue spots. Each finger on lever 192 (FIGS. 15, 20 and 21) has a flat carton engaging edge 192a and is pivoted at 193 on an extension 189a of the fitting 189, being pivotally connected at its lower end at 194 with a link 196 also pivotally connected at a point 197 of articulation of the chain 186. The idler sprockets are so related to the position of the upper leading buttons 188 and their cooperating levers 192 as seen in FIG. 20 to bring the finger 192 (as it travels around the curve of the sprocket) slightly ahead of the carton 10, and as it changes its position because of straightening of the chain it moves the face 192a of the lever 192 into flush engagement with the end panel of the carton at the same time that the buttons 188 are engaging the glue flaps 15 to perform a squaring operation. Subsequently, the chains 186 and the buttons 188 travel along with the carton at the same speed throughout the extent of travel provided for the setting of the glue.

Also, as seen in FIG. 19, rigidity is given to the chains 186 during their travel along the compression stretch of the conveyors by means including frame plates 198 engaging the back sides of the chains, an L-shaped overlying plates 199 which overlaps the top of the chain and provides a track with hte plate 198 to hold the inner edge of each chain 186 in the proper position. In this manner, a spot of pressure is applied over each spot of glue as the carton moves along, the pressure buttons traveling in synchronism with the carton so that the pressure is continually applied at the correct place to obtain the tight closure of the carton.

It will be appreciated that in the operation of squaring the carton, the lower portion of the carton is retained between the lugs 66 on the chain 36 and by the upright fingers or propeller bars 68 so that the bottom portion of the carton is always maintained square. Consequently, with this construction, it is only necessary to provide the squaring fingers 192 to cooperate with the buttons 88 at the leading end of the upper compression conveyors during the squaring operation. Where the carton conveyor is removed from the carton at the time it eners the compression stretch, it would be desirable to also provide the squaring fingers 192 and associated parts in connection with the lower leading pressure buttons.

*Timing control and circuit*

Referring to FIGS. 4 and 5 there is shown a plurality of conventional timing and control cams 201 secured on a shaft 202, and having associated therewith cam followers 203, each controlling a switch 204. The shaft 202 is driven by suitable gearing 206 from a drive shaft 207 of conventional construction so that the timing cams are driven in timed relation with the operation of the machine. These timing cams are so formed that they will close the circuit associated therewith at a desired time for particular operation, or will interrupt the circuit at a desired time in a cycle of operation. For example, the microswitch 174 (FIG. 5), having a control arm 174a is connected in circuit with one of the cams 201 so that, if the microswitch 174 is not closed at the proper time by a carton 10, the circuit for the operation of the gluing mechanism including cylinder 173 will be opened by a cam 201 and no glue will be applied if not carton is present.

Also, referring to FIG. 1, the microswitch 156 is located at an appropriate position so that if no carton is present at the time it is traveling past the microswitch 156, the circuit for the bottle feed will be inerrupted and the machine will be stopped so that no bottles are fed when no carton is present to receive them. The switch 156 controls the hydraulic cylinder 178 so as to activate this cylinder as previously described and positions the stop element 74 on the piston in relation to the lug 73a, as well as to interrupt the drive for the machine.

Also, for example, the microswitch 208 (FIGS. 1 and 2) is positioned in the path of the carton being fed to the carton conveyor so that if no carton is fed, the operation will be stopped.

The details of the circuit are not shown because they are conventional and it is only necessary to understand that the switches 204 are in circuit with the various microswitches installed as safety mechanisms along the machine so as to interrupt an operation when something goes wrong and the mechanism is not operating as it should.

*Operation*

The operation of the machine will be briefly reviewed to enable a better understanding thereof. As seen in FIGS. 1 and 2, and assuming a stack of folded cartons within the upright rods 42, and a supply of cans or bottles 70 on the single line conveyors 81, the machine is started in operation, and the first operation with respect to the cartons is a conventional eracting operation as described, the bell crank 63 (FIG. 3) serving to aid in the erection of the carton and to feed the carton into cooperation with the inclined rail 64 so that it is moved to partially erected condition as seen at the center of FIG. 2, where it is being conveyed by the preliminary feed conveyor chain 96 of the carton erecting mechanism. The carton is transferred to the main conveyors 36 at one of a plurality of carton erecting and holding stations formed by the propelling fingers or followers 68 and lugs 66, carried by the chains 36.

The carton moves along with the chains 36 in open position, its side panel portions 16 being moved up by the rails or plows 111, and its bottom flaps 19 being held underneath the plates 113, as seen in FIG. 8. At the same time the bottles 70 (FIG. 1) are being fed by the star wheels 83, one bottle at a time, into cooperation with the lugs 87 of the singling conveyor 86. These bottles are transferred from the lugs 87 to a position on the platform or table in front of a gathering lug 92 of the gathering conveyor 91 until three have been accumulated therein, and these three are carried by a lug 92 between the rails 97 and 98 and are placed in front of a progressor finger 69 and are introduced partway into the open side of the carton, as seen for example at the right of FIG. 1, and in FIG. 10. It will be noticed that at this time the spring fingers 131 (FIGS. 9 and 10) are erecting the two separating flaps 126 into position to be engaged between adjacent bottles 70 which complete the erection of the tabs 126 as they move between the pair of adjacent bottles.

Subsequently, as seen in FIGS. 4 and 15, the completion of the introduction of the bottles as a group into the carton is carried out by the cam 121 and its resilient peripheral edge 121a. At this time the resilient fingers 131a (FIGS. 12 and 13) serve to erect the separator tabs 126 sufficiently to be engaged by the entering bottles 70 as the bottles are introduced. All this goes along while the cartons and the bottles are being carried along at a uniform rate of speed.

This completes the operation of introducing the bottles so that the cartons containing the bottles are now ready for closing, and the preliminary closing is effected by certain carton flap folding means, including the rotary element or arm 141 (FIGS. 4, 4a and 5) with its tab and flap folding elements 141a and 141b and the resiliently supported follow arm or plow 152. A plow 155 engages and folds each leading triangular tab 14. The trailing triangular tabs 14 have a preliminary bend or folding effected therein by the folding ears 141a (FIG. 4a) on the arms 141. The timing of the operation of the folding of a trailing tab 14 by a folding element 141a as seen in FIG. 4a is such that this tab is bent over immediately before it would engage the inclined portion 155a of the plow 155 so that this inclined portion completes the folding operation on the trailing tab 14 and this tab continues along under the plow 155 until the side extension 16 of the top panel is folded down thereover as hereinafter described. This resiliently supported plow 155, which is free at one end, therefor, is interposed between adjacent part of the carton, and allows the carton to move out from engagement with this plow 155 at the time when its closing operation is substantially completed. At the same time, the leading side flaps 17 are closed by the bottom plows 154, and the trailing flaps 17 are engaged by the ears 141b on the arms 141 and moved into position so as to be engaged by these plows 154, the side portions 16 being maintained elevated in the position shown in FIG. 24, and as seen in FIG. 18. The carton is thus conditioned for the application of glue at four spots on each side and this is effected as the cartons are moving by conventional glue-applying nozzles 163, these nozzles being activated twice by their control cam 203 so as to spray apply the four spots of glue as seen in FIG. 24.

Subsequently, as the cartons move past and out of the gluing portal, the side portions 16 (FIGS. 16 and 17) are lowered to their final position by the rails 153 and the extensions 153a thereof, and the bottom flaps 19 are raised to their closed position by the bottom plows 181 and their rail extensions 182.

As the cartons move out from engagement with the bottom rails 182 and the top plows or rails 153, they move into cooperation with a squaring and compression mechanism comprising the four chains 186 (FIGS. 19 through 21). The squaring fingers 192 engage the leading end of the carton at its upper portion. The bottom of the carton is held by the propelling fingers 68 and the lugs 66. At the same time the sides of the carton at the glued spots are engaged by the spot compression buttons 188 at the leading end of the carton. Subsequently, other buttons 188 engage the four trailing spots at which pressure must be applied to enable the glue to set, and the carton travels along with the four chains 186 and with the eight buttons 188 applying pressure to the eight spots of glue thereon for a sufficient time to allow the glue to set, and the closed carton is discharged from the machine.

While I have shown and described a preferred embodiment of the invention, it is apparent that the invention is capable of variation and modification from the form shown so that the scope thereof should be limited only by the proper scope of the claims appended hereto.

What I claim is:

1. In a carton closing machine of the type adapted to operate with a plurality of bottles having crown caps, and a carton therefor having respective top, bottom and end panels, said bottom panel having respective side flaps to overlap the lower ends of the bottles, and top panel having apertured side panel portions hinged thereto and having side flaps, the apertures of said panel portions embracing the necks of said bottles below the crown caps thereof, and said end panels having respective side flaps to overlap the respective side flaps of said top and bottom panels and to be attached thereto by glue, a frame, a single file conveyor associated with said frame for carrying a single file of bottles in abutting relation therealong, a carton conveyor for carrying a carton of the above type in erected fashion along a path, means adjacent said path for feeding a group comprising a plurality of said bottles into an open side of said carton, means adjacent said path for holding a lower side flap of said carton in horizontal position whereby the group of bottles can be fed thereover, means adjacent said path for holding a top side panel portion of said carton in a position to permit the introduction of the bottles therein with the necks of the bottles engaged with the apertures of said side panels and with the crown caps spaced at least partially above said side panel, means operative during the travel of the carton with the bottles therein along its path for closing the side flaps of the end panels, means for applying spots of glue at the top and bottom respectively of each of said end panel flaps, means for thereafter folding the side flaps of the bottom panel up into engagement with the glue-carrying portions at the bottom of said end panel side flaps, and means for bending the top side panel portions downwardly so that they encompass the bottles around the necks thereof below the crown caps, and the side flaps thereof are brought into engagement with the glue spots at the top of the end panel side flaps, and means for holding the respective overlapping side flaps containing the glue therebetween in tight engagement as the carton travels.

2. In a machine for closing a moving carton in which the carton includes a tab which is overlapped by another portion of the carton, a frame, a conveyor on said frame for moving a carton along a path, means for introducing a plurality of containers into the carton, tab control means including a floating plow extending generally parallel to the path of travel of said carton and supported at its leading end and having an angled portion converging toward the carton during its travel along its path and positioned below said overlapping portion to engage said tab to produce a preliminary breaking and folding of the tab, means for folding the overlapping portion of the carton into engagement with said tab after the carton moves past said plow, and means for completing the closing of the carton.

3. In a machine for closing a moving carton in which the carton includes a tab which is overlapped by another portion of the carton, a frame, a conveyor on said frame for moving a carton along a path, means for introducing a plurality of containers into the carton, tab control means including a floating plow extending generally parallel to the path of travel of said carton and supported resiliently at its leading end only and having an angled portion converging toward the carton during its travel along its path and positioned below said overlapping portion to engage said tab to produce a preliminary breaking and folding of the tab, means for folding the overlapping portion of the carton into engagement with said tab after the carton moves past said plow, and means for completing the closing of the carton.

4. In a carton closing machine, a frame, a carton conveyor on said frame, means adjacent said conveyor for applying glue to certain portions of said carton, means adjacent said conveyor for folding other portions of said carton into overlapping relation with said glue receiving portions, and squaring means adjacent said conveyor for engaging the leading end of a carton, and including elements for engaging the leading end and an adjacent side thereof in locations at right angles to each other to effect a squared condition of the carton.

5. In a carton closing machine, a frame, a carton conveyor on said frame, means adjacent said conveyor for applying glue to certain portions of said carton, means adjacent said conveyor for folding other portions of said carton into overlapping relation with said glue receiving portions, squaring means adjacent said conveyor for engaging the leading end of a carton in locations at right angles to each other to effect a squared condition of the carton, and means for moving said squaring mean synchronously with said conveyor.

6. In a carton closing machine, a frame, a carton conveyor on said frame including a carton station having means for holding the lower part of a carton in required position, means adjacent said conveyor for applying glue to certain portions of said carton, means adjacent said conveyor for folding other portions of said carton into overlapping relation with said glue receiving portions, and squaring means for engaging upper part of the leading end of a carton in locations at right angles to each other to effect a squared condition of the carton.

7. In a container feed mechanism, a frame, a single file feed conveyor for containers on said frame, means for receiving containers from said single file feed, a rotary member for engaging successive containers of said single file feed including a stop lug, and normally inoperative means for interrupting the feed of containers by restraining them on said single file conveyor comprising a cylinder having a piston, a resilient stop member on said piston, being activated when it is desired to stop the bottles on said conveyor, and control means for said stop member for moving it into and out of the path of said stop lug.

8. In a container feed mechanism, a frame, a single file feed conveyor for containers on said frame, means for receiving container from said single file feed, a rotary member for engaging successive containers of said single file feed including a stop lug, and normally inoperative means for interrupting the feed of containers by restraining them on said single file conveyor comprising a cylinder having a piston, a resilient stop member on said piston, being activated when it is desired to stop the bottles on said conveyor, and control means for said stop member for moving it into and out of the path of said stop lug, said control means including a timing mechanism for controlling the timing of the movement of said stop member.

9. In a container feed mechanism, a frame, a single file feed conveyor for containers on said frame, a singulating conveyor having individual pockets for each container, a starwheel mounted adjacent the discharge end of said single file feed conveyor for transferring containers therefrom, one at a time, to the pockets of said singulating conveyor, means for driving said singulating conveyor at a faster speed than the normal movement of containers by said single file feed conveyor, a gathering conveyor for receiving the individual discharge of containers from said singulating conveyor and having spaced-apart conveying lugs thereon, and means for driving said gathering conveyor at a speed to control accumulation of a similar plurality of containers ahead of each gathering lug thereof.

10. In a container feed mechanism, a frame, a single file feed conveyor for containers on said frame, a singulating conveyor on said frame having individual pockets for each container, means mounted adjacent the discharge end of said single file feed conveyor for transferring containers one at a time therefrom to the pockets of said singulating conveyor, means for driving said singulating conveyor at a faster speed than the normal movement of containers by said single file feed conveyor, a gathering conveyor on said frame for receiving the individual discharge of containers from said singulating conveyor and having spaced-apart conveying lugs thereon, and means for driving said gathering conveyor at a speed to control accumulation of a similar plurality of containers ahead of each gathering lug thereof.

References Cited by the Examiner

UNITED STATES PATENTS

| | | | |
|---|---|---|---|
| 1,854,075 | 4/1932 | Smith et al. | 53—388 X |
| 2,631,642 | 3/1953 | Richardson et al. | 53—388 |
| 2,701,938 | 2/1955 | Murray | 53—48 X |
| 2,727,345 | 12/1955 | Schoppee | 53—388 |
| 2,756,553 | 7/1956 | Ferguson et al. | 53—186 X |
| 2,860,461 | 11/1958 | Arneson | 53—48 X |
| 2,873,565 | 2/1959 | Arneson | 53—48 X |
| 2,877,614 | 3/1959 | Currivan | 53—48 X |
| 2,885,841 | 5/1959 | Currie et al. | 53—48 X |
| 2,896,569 | 7/1959 | Ferguson et al. | 53—383 X |
| 2,914,899 | 12/1959 | McGihon | 53—48 X |
| 2,939,258 | 6/1960 | Anness | 53—48 X |
| 2,953,883 | 9/1960 | Gentry | 53—48 X |
| 2,974,454 | 3/1961 | Andre et al. | 53—48 X |
| 3,032,945 | 5/1962 | Currie et al. | 53—48 |
| 3,060,659 | 10/1962 | Blais et al. | 53—48 X |

GRANVILLE Y. CUSTER, JR., *Primary Examiner.*

ROBERT A. LEIGHEY, FRANK E. BAILEY,
*Examiners.*

D. E. LESLIE, S. ABEND, *Assistant Examiners.*